Feb. 25, 1964 T. J. GETTLE 3,122,421
APPARATUS AND METHOD OF OPERATING A CHEMICAL RECOVERY FURNACE
Filed July 13, 1959
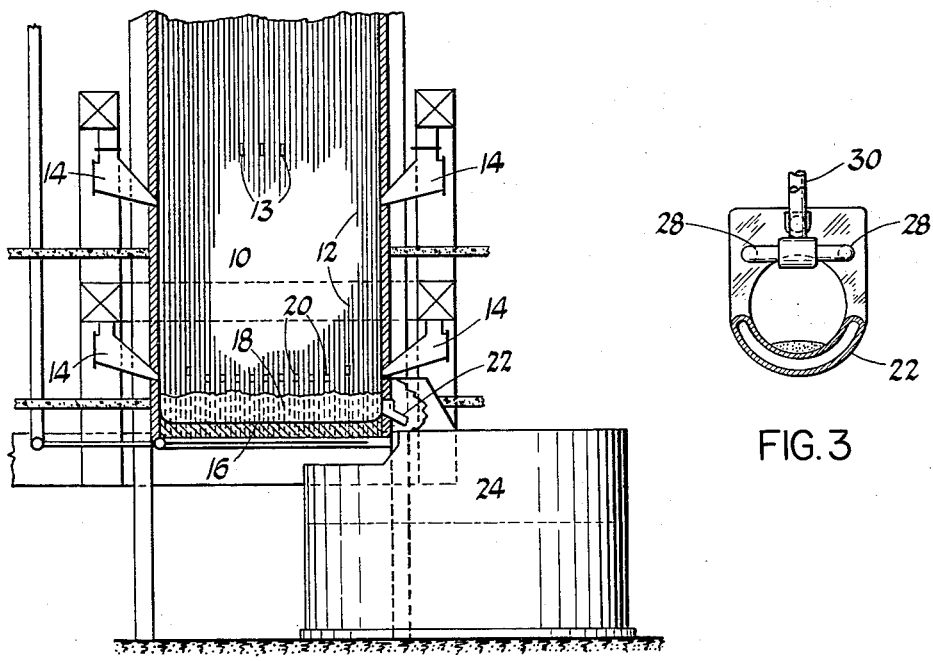
FIG. 1
FIG. 3
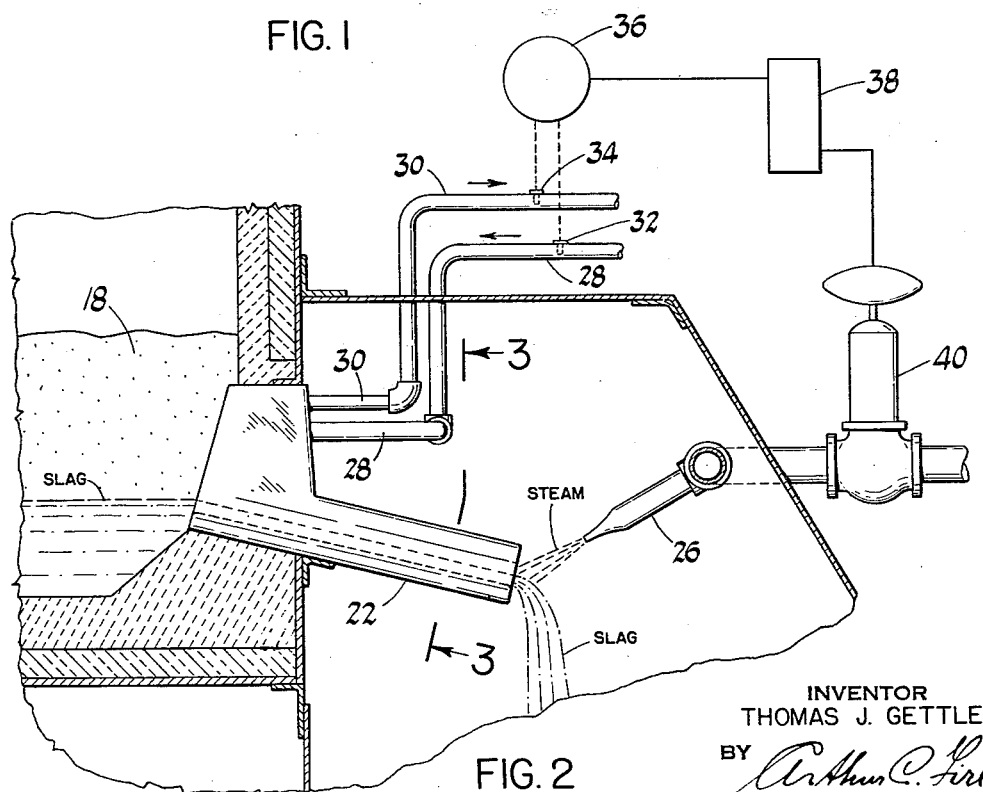
FIG. 2
INVENTOR
THOMAS J. GETTLE
BY
ATTORNEY United States Patent Office 3,122,421
Patented Feb. 25, 1964

3,122,421
APPARATUS AND METHOD OF OPERATING A
CHEMICAL RECOVERY FURNACE
Thomas J. Gettle, Dallas, Tex., assignor to Combustion
Engineering, Inc., New York, N.Y., a corporation of
Delaware
Filed July 13, 1959, Ser. No. 826,585
4 Claims. (Cl. 23—399)

The invention relates to a method and apparatus for discharging a molten fluid from a furnace smelter or melting pot and is particularly applicable to chemical recovery furnaces, such as those in which chemicals are recovered from the black liquor of wood pulp manufacture, two processes of which are known as the sulphate or kraft process and the sodium process.

In wood pulp manufacturing, the chemical solution produced during one stage of the process is called black liquor and is obtained from wood being digested by the action of caustic sodium or a mixture of caustic sodium and sodium sulphide. After the action of the chemical on the wood has been completed in the digester the material is washed and the wash liquor usually called black liquor contains substances which should be recovered from the standpoint of economical operation. In the sulphate process, for instance, said solution is later mixed with so-called "salt cake" acting as the make up of sodium sulphate, and is sprayed into the feeding and drying zones of the chemical recovery furnace for retrieval. Most of the water is driven off by the heat in the furnace and charred particles are formed containing little moisture. This char or black ash, as it is frequently called, constitutes the dry solids in the black liquor and collects on the bottom or hearth of the furnace, the carbonaceous material in the dry solids is burned out in the combustion zone directly above the hearth or thereon and the heat thus generated is used for maintaining the chemical reaction taking place in the furnace and is also used for producing steam in the associated waste heat boiler. The chemical inorganic ash remaining after the burning of the combustible is fused by the heat of combustion. As this chemical ash is melted the sodium sulphate in the presence of carbon and a reducing atmosphere is reduced to sodium sulphide. The sulphide is then removed from the furnace by spouting the molten smelt to a dissolving or mixing tank by way of one or more smelt spouts located at the furnace bottom and extending through the walls thereof.

In the mixing tank the smelt is added to water and goes into solution to form so-called green liquor. As the green liquor is withdrawn from the tank make up water is added in corresponding quantities. The withdrawn green liquor is further processed in the caustisizing room by preparing it with lime to produce white liquor for the digester.

When the hot smelt from the furnace is poured, in the form of a solid stream, into the body of water or green liquor contained in the mixing tank, a noisy explosive reaction takes place which at times may be so violent that the top of the mixing tank is blown off or other damage is inflicted upon the recovery apparatus with attending danger to life and limb of the operating personnel. It was found that the violence of the explosive reaction in the tank can be controlled by breaking up the stream of smelt issuing from the smelt spout before the smelt comes in contact with the green liquor in the tank. Such disintegration or shattering of the smelt is accomplished by directing a jet of gaseous medium such as air or steam against the stream of smelt while it is leaving the smelt spout. However, the flow of smelt from the furnace is not always uniform and the strength thereof depends in a large measure on furnace operating variables which may produce pools of molten smelt in the bed of the hearth and sudden flushes which are believed to be the most important contributors to the violence of tank explosions. Such sudden increase in the smelt flow can seldom be predicted. It is therefore practically impossible to meet these flushes by manually supplying a more powerful jet of shatter steam in time to prevent the impending explosion. To meet these conditions it has been the practice to direct an excessive amount of steam continuously against the smelt discharge at a pressure and velocity which is considered sufficient for breaking up even the heaviest smelt run off that could possibly be experience. This operating procedure obviously results in a considerable waste of steam and substantially reduces the economy of the chemical recovery apparatus.

It is accordingly a primary object of the invention to increase the operating efficiency and operating safety of a chemical recovery furnace and associated apparatus.

Other objects and advantages of the invention will become apparent from the following description of an illustrative embodiment thereof when taken in conjunction with the accompanying drawing wherein:

FIG. 1 is a partial elevational cross section of a chemical recovery furnace;

FIG. 2 is an enlarged view of the smelt spout and steam nozzle including a control diagram for regulating the discharge of steam from the nozzle;

FIG. 3 is a front view of the smelt discharge spout and steam nozzle when taken on line 3—3 of FIG. 2.

Referring now to FIG. 1 the numeral 10 denotes a conventional chemical recovery furnace the four walls of which are lined with exposed and closely spaced water cooling tubes 12 which are connected to a waste heat boiler, not shown, for circulation of water and generation of steam as disclosed in detail in the U.S. Patent 2,602,022, issued to W. S. Patterson on July 1, 1952. The black liquor at the desired concentration of solids is introduced into the furnace chamber in a fluid state by way of nozzles 13. Combustion is supported by preheated air entering through inlets 14. Combustion of the lighter volatiles takes place at this stage. The small amount of water contained in the liquor is almost completely evaporated at this time by the heat liberated and by the hot gases rising in the smelter furnace. The solid content or black ash falls to the hearth 16 in a nearly dry state where it burns in a bed 18. Additional preheated air is admitted into this bed as by means of inlets 20 in an amount sufficient to continue combustion in a reducing atmosphere in the bed 18.

In the black ash bed 18 evaporation of the small remaining percentage of moisture contained in the black ash occurs. Final deterioration of volatiles and burning of the solid combustible material takes place and sodium sulphate is converted into sodium sulphide in the presence of carbon and in a reducing atmosphere. This sodium sulphide is one component of a hot molten mixture called "smelt" which collects at the very bottom of the furnace below the bed 18 and essentially consists of sodium carbonate and sodium sulphide. The smelt is continuously withdrawn from the furnace by way of smelt spout 22 into dissolving tank 24.

Dissolving tank 24 serves the purpose of mixing the hot smelt with water so as to produce green liquor as earlier herein described. In order to minimize the explosive reactions occuring when hot smelt enters a body of water in the tank, a nozzle 26 is disposed above and to the front of the smelt spout 22 for the purpose of directing a jet of gaseous medium such as air or steam downwardly against the issuing stream of smelt, thereby disintegrating or shattering the smelt before it comes in contact with the water or green liquor in tank 24.

Smelt spout 22 is exposed to the high temperature of the smelt as well as to the reaction of the chemicals with the material of which the spout is made. To prolong the life of the smelt spout cooling is provided by passing a continuous stream of cold water through the hollow interior of the spout. Thus as shown in FIG. 2 cooling water enters the spout by way of pipe 28 and while passing and circulating through the interior of the spout this cooling water is being heated and leaves by way of pipe 30. It has been found that the amount of heat absorbed by the water bears a direct relationship to the amount of smelt that passes through the smelt spout. Accordingly the temperature rise of the cooling water can be used as a measure for the amount of smelt discharged from the spout into the mixing tank. For this purpose a temperature indicating device 32 is provided in pipe 28 and a temperature indicating device 34 in pipe 30. The temperature controller 36 establishes the temperature difference between the water entering and the water leaving and passes a corresponding impulse to a relay 38 which in turn functions to operate the steam control valve 40 by a suitable pressure medium such as air.

My inventive apparatus and method accordingly permits the regulation of the flow, pressure or velocity of the shatter steam in response to the heat picked up by the cooling fluid passing through the smelt spout. This heat pick-up is in turn a direct measure of the amount of smelt flowing out of the spout. A sudden increase of smelt flow accordingly results in an immediate greater heat pick-up by the cooling fluid and causes a correspondingly more powerful jet of steam or other gaseous medium to issue from nozzle 26. The more powerful steam flow results in an increase in shattering effect in proportion to the increase in smelt discharge. The possibility of an explosive reaction in the mixing tank 24, which would be damaging to the apparatus or dangerous to the operating personnel, is accordingly substantially reduced. My invention accordingly permits automatic regulation of the flow of shatter steam in response to smelt flow with a minimum of delay. The use of shatter steam is therefore reduced to the most economical quantity.

I have described herein a preferred apparatus and method wherein the flow rate of the hot smelt out of the spout of a smelter furnace is measured by the amount of heat picked up by the cooling fluid. However, my invention could equally well be practiced in an apparatus wherein the flow rate of the smelt is measured by other means, such means being employed to control the flow rate of the shatter fluid in proportion to the flow rate of the smelt being discharged.

While I have illustrated and described a preferred embodiment of my invention, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. In a chemical recovery apparatus having a furnace, a smelt spout for discharging a stream of molten smelt from the hearth of said chemical recovery furnace; a smelt mixing tank for receiving said stream of smelt; nozzle means for discharging steam at high velocity against said stream of smelt to cause collision therewith while flowing into said tank, whereby to shatter said stream of smelt; the improvement comprising heat absorbing means reflecting variations in the quantity of the smelt issuing from said spout; and means for increasing or decreasing the discharge velocity of said medium issuing from said nozzle in response to an increase or decrease respectively of the said quantity of smelt flowing from said spout into said tank is indicated by said heat absorbing means.

2. In a chemical recovery apparatus having a furnace, a smelt spout for discharging a stream of liquid smelt from the hearth of said chemical recovery furnace; a smelt mixing tank for receiving said stream of smelt; nozzle means for discharging a fluid medium against said stream of smelt to cause collision therewith while being discharged into said tank, whereby to shatter said stream of smelt; the improvement comprising means for flowing a cooling medium in heat absorbing and cooling relation with said spout thereby establishing a temperature difference between the unheated and heated state of said cooling medium, said temperature difference increasing with an increase or decreasing with a decrease respectively of the rate at which the smelt is being discharged from said spout; temperature responding means organized to measure said temperature difference; a flow regulator operatively associated with said nozzle means; and control means activating said regulator for increasing or decreasing the flow of said fluid medium through said nozzle means in response to an increase or decrease respectively of the temperature difference of said cooling medium as indicated by said temperature responding means, whereby to prevent excessive smelt explosions due to an insufficient and delayed flow of said gaseous smelt shattering medium.

3. In a chemical recovery process employing a furnace having a hearth from which is discharged in a continuous but variable quantity a stream of hot liquid smelt via a smelt spout into a mixing tank partially filled with green liquor, the method of preventing excessive smelt explosions in said tank, comprising the steps of shattering the stream of smelt after leaving the spout and before arriving at the surface of the green liquor in the tank, obtaining an indication of the relative quantity of the smelt leaving said spout and entering said tank as reflected in the variations of the outlet temperature of a cooling fluid cooling said spout, and increasing or decreasing the severity of said shattering effect upon said smelt as said quantity increases or decreases respectively, whereby greatly diminishing the violence of the smelt explosions within said tank upon contact of said hot smelt with said green liquor.

4. In a chemical recovery process employing a furnace having a hearth from which is discharged in a continuous but variable quantity a stream of hot liquid smelt via a smelt spout into a mixing tank partially filled with green liquor, the method of preventing excessive smelt explosions in said tank, comprising the steps of shattering the stream of smelt after leaving the spout and before arriving at the surface of the green liquor in the tank, obtaining a relative measure of variations in the quantity of the smelt leaving said spout and entering said tank by indications of changes in the temperature of a fluid absorbing heat from said smelt while said smelt is being discharged from said hearth, and increasing or decreasing the severity of said shattering effect upon said smelt as said temperature increases or decreases respectively, whereby effectively and directly diminishing the violence of the smelt explosions within said tank upon contact of said hot smelt with said green liquor.

References Cited in the file of this patent

UNITED STATES PATENTS

| | | |
|---|---|---|
| 390,960 | Gustin | Oct. 9, 1888 |
| 2,007,799 | Gloersen | July 9, 1935 |
| 2,188,927 | Slayter | Feb. 6, 1940 |
| 2,367,851 | Eaton | Jan. 23, 1945 |
| 2,602,022 | Patterson | July 1, 1952 |
| 2,673,787 | Greenwalt | Mar. 30, 1954 |
| 2,701,755 | Strausser | Feb. 8, 1955 |
| 2,967,758 | Thorson | Jan. 10, 1961 |